United States Patent [19]

Schleimer

[11] Patent Number: 4,675,049

[45] Date of Patent: Jun. 23, 1987

[54] PROCESS FOR PRODUCING HIGH QUALITY STEEL

[75] Inventor: François Schleimer, Foetz, Luxembourg

[73] Assignee: Arbed S.A., Luxembourg

[21] Appl. No.: 870,518

[22] Filed: Jun. 4, 1986

[51] Int. Cl.$^4$ ................................................ C21C 7/00
[52] U.S. Cl. ............................................ 75/48; 75/57
[58] Field of Search ...................................... 75/48, 57

[56] References Cited

U.S. PATENT DOCUMENTS 3,702,243  11/1972  Miltenberger ........................... 75/48

Primary Examiner—Peter D. Rosenberg
Attorney, Agent, or Firm—Fishman & Dionne

[57] ABSTRACT

A process for producing high quality steel includes a first step of decarburizing the melt in a converter by top blowing with oxygen to a carbon content of less than 0.1% carbon. Next, carbon (comminuted coal) is delivered to the melt at a high velocity whereby the melt and slag will boil intensely with the carbon being delivered until the oxygen content of the melt is less than or equal to about 250–400 ppm oxygen and the carbon content is greater than or equal to about 0.04–0.07% carbon. In the third step, recarburization of the melt is effected in either the converter or a ladle whereupon a melt having as little oxygen as is reasonably possible; and a carbon content close to that desired is achieved. Finally, in a fourth step, the melt (which is now in a ladle) is treated with synthetic slag and with a material that is both deoxidizing and desulphurizing (i.e., metallic calcium) whereby a high quality steel is produced.

17 Claims, No Drawings

PROCESS FOR PRODUCING HIGH QUALITY STEEL

BACKGROUND OF THE INVENTION

This invention relates to a process for producing high-quality steel using an oxygen top-blowing procedure. In the present invention and for purposes of this application, high quality steel is defined as a steel which contains as little phosphorus, sulphur and non-metallic inclusions as is reasonably possible.

A known method for achieving the desired carbon content in a melt comprises the discontinuance of the decarburizing process step at the pre-selected time. However, a disadvantage or drawback of this method is that it does not permit the production of steels having both high carbon and low phosphorus contents. Nevertheless, if it is desired to obtain steels having low phosphorus content, a pre-treatment (dephosphorizing, desulphurizing, desilicizing) of the hot metal melt is necessary. Such pre-treatments, which have been described primarily by Japanese steelmakers in various printed documents, are performed outside of steelmaking converters, in stationary or transportable ladles; and generate high costs due in part, to the expensive apparatus which must be used. It will be appreciated that the inevitable temperature losses inherent such processes have to be either borne or compensated through heating devices thus leading to increased costs and further disadvantages. It should be noted that only by using the method described above wherein the desired carbon content is obtained through discontinuing the decarburization step, will low inclusion (phosphorus) contents steel also be obtained.

Another known method which allows low phosphorus contents in steel to be obtained at lower costs, involves decarburizing the steel down to low carbon-contents, eg. 0.05% C. However, with this method, the decarburized steel will contain relatively high amounts of oxygen, depending upon the conditions (for example, 500 to 1000 ppm, and even more that that), the removal of which through conventional means not only requires large amounts of expensive substances, but also generates undesired inclusions.

SUMMARY OF THE INVENTION

The above discussed and other problems and deficiencies of the prior art are overcome or alleviated by the process of the present invention which permits the production of high-quality steel, with a minimum content of non-metallic inclusions. In accordance with the present invention, a novel steel making process utilizes the combination of several steps including a first step of decarburizing the melt in a converter by top blowing with oxygen to a carbon content of less than 0.1% carbon. Next, carbon (comminuted coal) is delivered to the melt at a high velocity whereby the melt and slag will boil intensely with the carbon being delivered until the oxygen content of the melt is less than or equal to about 250-400 ppm oxygen and the carbon content is greater than or equal to about 0.04-0.07% carbon. In the third step, recarburization of the melt is effected in either the converter or a ladle whereupon a melt having as little oxygen as is reasonably possible; and a carbon content close to that desired is achieved. Finally, in a fourth step, the melt (which is now in a ladle) is treated with synthetic slag and with a material that is both deoxidizing and desulphurizing (i.e., metallic calcium) whereby a high quality steel is produced.

DESCRIPTION OF THE PREFERRED EMBODIMENT

The first step in the process of the present invention comprises decarburizing of the melt in a converter, by top-blowing oxygen and adding the well-known substances necessary to convert silicon and phosphorus into slag. The decarburization step generates heat and the resultant slag becomes reactive due to the oxygen input, thereby absorbing a portion of the phosphorus. The decarburization step is continued to produce a carbon content lower than 0.10% C., preferably lower than 0.05% C., (irregardless of the final carbon content which is desired in the finished steel.

The second step in the present invention comprises treating the decarburized and oxygen-enriched melt with carbon, within the converter. This process step is performed by introducing, at the highest velocity possible, carbon (preferably in the form of comminuted coal such as anthracite) into the melt. This second step generates an extraordinarily vehement reaction during which the metal bath is both deoxidized and recarburized. It will be appreciated that contrary to conventional deoxidization in a ladle with combinations of coal, ferromanganese, ferrosilicon, aluminum a.o., the products of deoxidization are exclusively gaseous in the instant case and will therefore not yield inclusions. In this step, high amounts of carbon monoxide are generated, which result in a forceful mixing of the metal phase with the slag phase.

In accordance with the present invention, care is taken to profit from the slag reactivity. The reaction of the second step is thus performed with the purpose of obtaining a strong stir and an intense mixing of the bath with the slag. An advantageous method comprises top-blowing the carbon through a special lance, wherein the carbon particles are suspended in an inert gas and are accelerated to high speeds. It has been found advantageous to further bottom-blow an inert gas in the melt during the addition of carbon, in order to even further improve mixing of the bath and slag.

The second step is ceased at an oxygen-content of about 250-400 ppm oxygen. At this point, the melt still has a very low carbon content (of about 0.04-0.07% C.). It has been noticed that during the addition of carbon in the second step, the carbon at first primarily deoxidizes the melt before recarburizing the same. In fact, the combination of the coal injection and the bottom-stirring result in lowering the product Carbon: Oxygen ratio to its thermodynamic equilibrium value in accordance with the actual temperature and gas pressure conditions in the metal bath. For example, prior to coal addition: % C=0.032; ppm O=900; after coal addition: % C=0.057; ppm O=350. Significantly, at the same time, it has been observed that a surprisingly high dephosphorization of the bath has occurred.

If especially low phosphorus content is desired, for example, 0.008% P or less, in accordance with the present invention, an $Na_2O$-bearer (i.e. suitable known compounds that yield $Na_2$ upon thermal decomposition), will be added. These may be added for example, by top-blowing, together with the carbon.

The third step in the process of the present invention comprises a treatment of the deoxidized and partly decarburized bath (taking into consideration the actual conditions relative to bath temperature, oxygen content, carbon content, etc.). It will be appreciated that the ratio of Carbon:Oxygen at a given temperature will be important with regard to the remainder of the process.

It will be appreciated that one of the primary objects of the present invention is to suppress the tendency of the steel to form inclusions. As a consequence, the next process step will be to transfer to a ladle a melt that contains as little oxygen as possible and that has a carbon content as close to the desired content as possible. Preferably, the ladle should be free from any heating means. In order to avoid producing solid deoxidation products, the deoxidation should be carried out with carbon as far as feasible, thus creating only carbon monoxide and carbon dioxide.

Thus, in a first embodiment of the process of the present invention, treatment of the melt with carbon continues within the converter, until the desired carbon content is reached. If this desired content is, for example, close to 0.10% C., the corresponding oxygen content will be close to 200 ppm O. Thereafter, the melt is transferred into the ladle.

A second embodiment of the present invention comprises continuing the treatment of the melt with carbon in the ladle, so as to limit the amounts of carbon injected in the converter. In that case, the entire amount of carbon is added in the form of a commercially available recarburizer, during the transfer in the ladle and prior to adding alloying materials.

Whether the third process step is carried out in a converter or in a ladle, surprisingly, the rephosphorization that should normally be expected does not occur. It is believed that this unexpected result is because the second step does not only entail conversion of carbon and oxygen to carbon monoxide and carbon dioxide, plus a dissolution of carbon in iron; but also that there occurs some type of interaction between the slag and the carbon. It is further believed that this interaction at first is due to a strong reactivity towards phosphorus and also partially sulphur, and at a certain time has a maximum intensity; and towards the end of the treatment turns into a pronounced passivity. At the term of the treatment, the slag is passive and will not pass on phosphorus to the melt, despite a treatment with reducing materials.

This passivity also influences the Carbon:Oxygen equilibrium in the converter through addition of materials such as ferromanganese, by injecting said materials in the melt (i.e. permits a lowering of the oxygen-content of the bath, while preserving its carbon content, and not suffering from rephosphorization). While this phenomenon generates solid deoxidation products, due to the still elevated bath temperature and to the bath-diameter:bath-height ratio (which is more favorable in the converter than in the ladle), these deoxidization products do not turn into inclusions in the finished steel, but precipitate entirely and are absorbed in the slag.

Finally, a fourth step in the process of the present invention comprises treating the melt, in a ladle, with a deoxidizing and desulphurizing agent, preferably with metallic calcium and with well known synthetic slags. As a result, the renewed oxygen-surplus (which is due to the inevitable temperature drop) is removed leading to the creation of relatively large globular oxidized products. It will be appreciated that large globular bodies will more readily rise and precipitate from the metal phase than small or non-globular particles.

The above-described process of the present invention can be used in order to manufacture both semi-killed and fully killed steels.

While preferred embodiments have been shown and described, various modifications and substitutions may be made thereto without departing from the spirit and scope of the inventions. Accordingly, it is to be understood that the present invention has been described by way of illustrations and not limitation.

What is claimed is:

1. A process for producing steel from a melt, said process including the steps of:
    decarburizing a melt in a converter by top-blowing said melt with oxygen wherein the carbon content of said melt is lowered to less than about 0.1% carbon;
    creating a slag on said melt by the addition of slag forming agent therein;
    treating said melt with carbon by delivering carbon into said melt at a high velocity whereby said melt and said slag mix until the oxygen content of said melt is less than or equal to about 250–400 ppm oxygen and the carbon content of said melt is greater than or equal to about 0.04–0.07% carbon; and
    recarburizing said melt whereby said melt contains as little oxygen as is reasonably possible and has a carbon content which is as close as possible to a pre-selected carbon content whereupon said melt is transferred to a ladle.

2. The process of claim 1 wherein:
said carbon is coal.

3. The process of claim 2 wherein:
said coal is comminuted coal.

4. The process of claim 3 wherein:
said comminuted coal is anthracite.

5. The process of claim 1 wherein:
said step of recarburizating said melt is accomplished in either a converter or a ladle depending upon temperature, preselected carbon:oxygen ratio and desired pre-selected carbon 6. The process of claim 1 wherein:
said deoxidizing and desulphurizing material is metallic calcium.

7. The process of claim 1 wherein:
said carbon is delivered by suspending said carbon in an inert gas and by blowing said suspended carbon through a lance onto the melt surface.

8. The process of claim 1 wherein:
dephosphorization occurs in said step of delivering carbon into said melt at a high velocity and wherein said dephosphorization is enhanced by adding a $Na_2O$-bearing material.

9. The process of claim 7 wherein:
dephosphorization occurs in said step of delivering carbon into said melt at a high velocity and wherein said dephosphorization is enhanced by adding a $Na_2O$-bearing material.

10. The process of claim 1 wherein:
deoxidization occurs in said recarburizing step and wherein said deoxidization is enhanced by adding ferromanganese.

11. The process of claim 7 wherein:
deoxidization occurs in said recarburizing step and wherein said deoxidization is enhanced by adding ferromanganese.

12. The process of claim 8 wherein:

deoxidization occurs in said recarburizing step and wherein said deoxidization is enhanced by adding ferromanganese.

13. The process of claim 1 including the further step of:
   treating said melt both with a synthetic slag and with a material that is both deoxidizing and desulphurizing subsequent to said recarburizing step.

14. The process of claim 5 including the further step of:
   treating said melt both with a synthetic slag and with a material that is both deoxidizing and desulphurizing subsequent to said recarburizing step.

15. The process of claim 7 including the further step of:
   treating said melt both with a synthetic slag and with a material that is both deoxidizing and desulphurizing subsequent to said recarburizing step.

16. The process of claim 8 including the further step of:
   treating said melt both with a synthetic slag and with a material that is both deoxidizing and desulphurizing subsequent to said recarburizing step.

17. The process of claim 10 including the further step of:
   treating said melt both with a synthetic slag and with a material that is both deoxidizing and desulphurizing subsequent to said recarburizing step.

* * * * *